(12) United States Patent
Iwasaki

(10) Patent No.: US 7,852,578 B2
(45) Date of Patent: Dec. 14, 2010

(54) LENS BARREL AND CAMERA INCLUDING IT

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/439,112

(22) PCT Filed: Sep. 4, 2007

(86) PCT No.: PCT/JP2007/067550

§ 371 (c)(1),
(2), (4) Date: Feb. 26, 2009

(87) PCT Pub. No.: WO2008/029936

PCT Pub. Date: Mar. 13, 2008

(65) Prior Publication Data

US 2010/0020412 A1    Jan. 28, 2010

(30) Foreign Application Priority Data

Sep. 4, 2006   (JP) ............................ 2006-239214
Apr. 10, 2007  (JP) ............................ 2007-102394

(51) Int. Cl.
  *G02B 7/02* (2006.01)
(52) U.S. Cl. ........................ 359/819; 359/821; 359/822
(58) Field of Classification Search ................ 359/819, 359/821, 822, 823, 824, 826, 811
See application file for complete search history.

(56) References Cited

U.S. PATENT DOCUMENTS

| 6,853,499 | B2 | 2/2005 | Iwasaki et al. |
| 7,230,773 | B2 * | 6/2007 | Nomura et al. ............. 359/696 |
| 2003/0081325 | A1 | 5/2003 | Nomura et al. |
| 2004/0130803 | A1 | 7/2004 | Iwasaki |
| 2006/0056078 | A1 | 3/2006 | Nomura et al. |

FOREIGN PATENT DOCUMENTS

| JP | 04-221914 | 8/1992 |
| JP | 2003-140018 | 5/2003 |
| JP | 2003-270509 | 9/2003 |
| JP | 2004-144790 | 5/2004 |
| JP | 2006-071844 | 3/2006 |

* cited by examiner

*Primary Examiner*—Timothy J Thompson
(74) *Attorney, Agent, or Firm*—Dickstein Shapiro LLP

(57) ABSTRACT

A lens barrel includes a plurality of lens groups (1, 2), lens frames (1a, 2a) to hold the plurality of lens groups, respectively, a lens driving apparatus to drive the plurality of lens frames and a fixed member (5) to hold the lens driving apparatus. The lens driving group includes a rotational member (6) which is forwardly moved while rotating relative to the fixed member (5), a linearly moving guide member (7) which moves with the rotational member (6) in the optical axial direction while limiting rotation of the lens frames and is not capable of rotating, and a linearly moving-guide biasing member (8) which is capable of moving in the optical axial direction relative to the linearly moving guide member and is configured to limit rotation. The linearly moving-guide biasing member has a resilient structure configured to bias the linearly moving guide member in the optical axial direction.

18 Claims, 7 Drawing Sheets

LENS BARREL AND CAMERA INCLUDING IT

CROSS-REFERENCE TO THE RELATED APPLICATIONS

This application is based on and claims priority from each of Japanese Patent Application No. 2006-239214, filed on Sep. 4, 2006 and No. 2007-102394, filed on Apr. 10, 2007, the disclosure of which is incorporated herein by reference in its entirety.

BACKGROUND ART

1. Field of the Invention

The present invention relates to an improvement in a lens barrel including a plurality of lenses and a lens driving apparatus or zoom lens driving apparatus configured to drive the lenses from a collapsed position to a photographic or extended position, and a camera including the lens barrel, more specifically to a lens barrel including a lens driving apparatus or zoom lens driving apparatus capable of performing stable operation without backlash.

2. Description of Related Art

In recent years, each of a large number of lens barrels used to photograph is mainly applied for a zoom lens configured to vary a focal distance continuously by changing positions of a plurality of lens groups in photographing. On the other hand, in case of non-photograph, the lens barrel is mainly used as a miniaturized collapsable-type-zoom lens barrel in which the lens groups are accommodated in a fixed cylinder of the lens barrel by moving relatively the lens groups so that small intervals are set among the lens groups.

Such a lens barrel includes a lens moving structure in which a rotational cylinder is attached to the fixed cylinder and lens frames are moved in a direction of an optical axis through a cam or helicoidal engagement structure when the rotational cylinder is rotated relative to the fixed cylinder.

The lens moving structure has a typical mechanism in which a rotational cylinder is engaged with a fixed cylinder through a cam structure so that the rotational cylinder rotates and forwardly and backwardly moves through the cam structure. The lens moving structure includes a linearly moving guide cylinder which is disposed in the rotational cylinder, rotatable relative to the rotational cylinder and moves together with the rotational cylinder in a direction of an optical axis and lens frames which are disposed in the linearly moving guide cylinder and configured to hold a plurality of lenses, respectively. Each of the lens frames has a cam follower which passes through a linearly moving groove of the linearly moving guide cylinder extending in the optical axial direction and engages with a cam groove provided in an inner surface of the rotational cylinder.

When the rotational cylinder is rotated, the lenses can be moved to any position within a movable range without being rotated. For example, a rotational key provided on the linearly moving guide cylinder to radially project is engaged in a peripherally extending rotational groove provided in the inner surface of the rotational cylinder, thereby the linearly moving guide cylinder can be rotated about an optical axis relative to the rotational cylinder, but can be moved together with the rotational cylinder in the optical axial direction.

A lens barrel needs to align an optical axis of each lens group in order to maintain image-focusing property. However, as the number of driving parts to move lenses increases, it is difficult to align the optical axis of each lens. As the lend barrel is downsized, it is required to enhance accuracy for alignment of the optical axis of each lens.

As a method for aligning the optical axis of each lens, it is proposed to hold two lens group frames with an inner diameter of one lens group frame (for reference, see Japanese Patent Application Publication No. 2003-270509). According to a technology as disclosed in Japanese Patent Application Publication No. 2003-270509, coaxial performance of a first lens group and a second lens group is maintained with relatively high accuracy. However, because one lens frame is supported by a rotational cylinder and a linearly moving guide cylinder, fall over of the lenses due to a backlash generated in these parts occurs.

Consequently, it is not possible to align the optical axis of each lens. Also, there is known a technology configured to compensate lens frames to a correct position from a deviated position by use of springs biasing each of the lenses (for reference, see Japanese Patent Application Publication No. 2006-071844). However, there is a problem that when each lens is in a collapsed potion, a biasing force is applied to structural parts, a large energy is required to move the lens frames and so on between the collapsed position and a photographic position.

SUMMARY OF THE INVENTION

An object of the present invention to provide a lens barrel in which lens frames holding lens groups are stably positioned to a correct position without fall over of the lens groups, a biasing force is applied to moving parts, for example, the lens groups when each lens group is extended to a photographable position, but a biasing force is not applied to the lens groups when the lens groups are not in the photographable position, as a result, extra large energy is not required at the time of operating the lens barrel.

To accomplish the above object, a lens barrel according to one embodiment of the present invention includes a plurality of lens groups, a plurality of lens frames each of which holds each of the plurality of lens groups, a lens driving apparatus configured to move the lens frames in an optical axial direction, and a fixed member to hold the lens driving apparatus.

The lens driving apparatus is capable of moving the lenses from a collapsed position to a photographic position. The lens driving apparatus includes a rotational member capable of moving in the optical axial direction while rotating relative to the fixed member, a linearly moving guide member which moves with the rotational member in the optical axial direction while limiting rotation of the lens frames and is not capable of rotating, and at least one linearly moving-guide biasing member which is capable of moving in the optical axial direction relative to the linearly moving guide member and is configured to limit rotation, The linearly moving-guide biasing member has a resilient structure configured to bias the linearly moving guide member in the optical axial direction.

DETAILED DESCRIPTION OF THE PREFERRED EMBODIMENTS

The preferred embodiments of the present invention will be explained in detail with reference to the accompanying drawings.

First Embodiment

Figure 1:
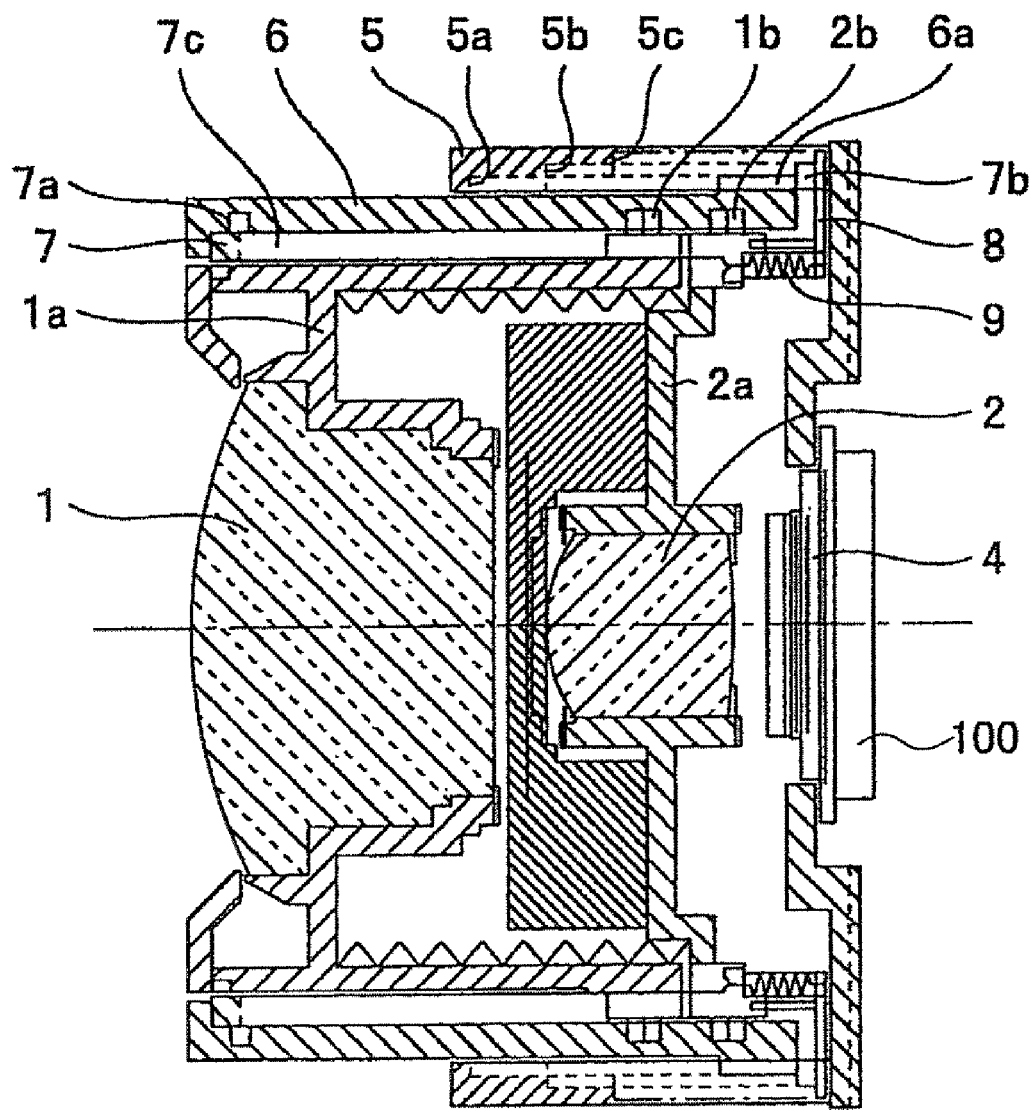
FIG. 1 is a sectional view showing a first embodiment of a lens barrel according to the present invention, in which the lens barrel is applied to zoom lens groups and the zoom lens groups are collapsed.
Figure 2:
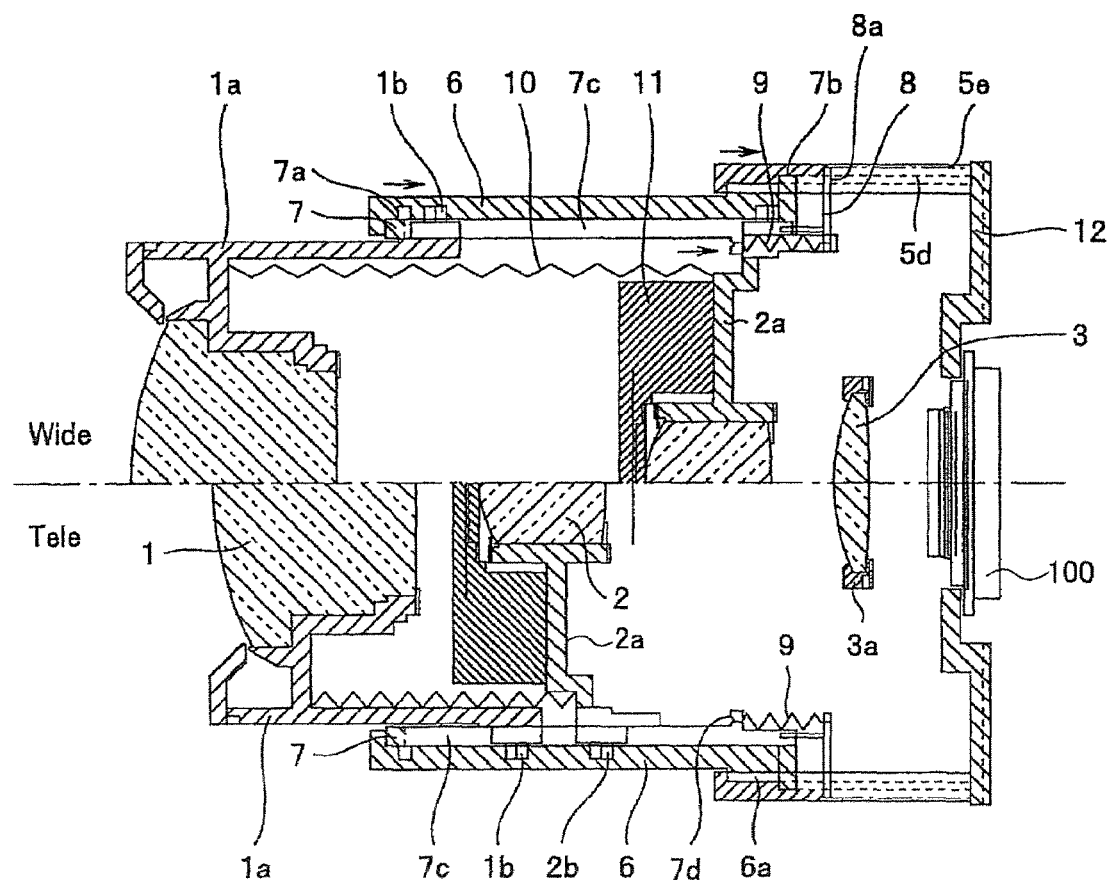
FIG. 2 is a sectional view showing the first embodiment of the lens barrel as shown in FIG. 1, in which an upper half shows a state where each of the lens groups is in a wide angle end and a lower half shows a state where each of the lens groups is in a telescopic end.

FIGS. 1 and 2 illustrate a first embodiment of a lens barrel according to the present invention. The lens barrel in the first embodiment is applied for a zoom lens barrel.

The lens barrel or zoom lens barrel includes a lens system having a plurality of lens groups, for example, a first lens group 1, a second lens group 2 and a third lens group 3 (see FIG. 2) which are disposed with intervals on an optical axis and capable of moving along the optical axis and a lens driving apparatus or zoom lens driving apparatus (mentioned hereinafter) configured to drive the lens system, or the first, second and third lens groups 1, 2 and 3 from a collapsed position to a photographic or extended position.

FIG. 1 illustrates a state where the lens barrel or the lens groups are in the collapsed position. FIG. 2 illustrates a state where the lens groups are in a photographic position or extended position. In FIG. 2, an upper half illustrates a state where each of the lens groups is moved to a wide angle (short focal distance) end and a lower half illustrates a state where each lens group is moved to a telescopic (long focal distance) end.

The zoom lens barrel is configured to perform continuous variable magnification or zooming by changing a position of each of the first lens group 1 and the second lens group 2 by the lens driving apparatus depending on a predetermined moving curve. The first lens group 1 comprises a focus lens to focus an image. The third lens group 3 is supported on, for example, a rotatable arm type-lens frame to be moved in a transverse direction to the optical axis. The third lens group 3 can be retracted out of the optical axis in the collapsed state as shown in FIG. 1 so that a size in an optical axial direction of the entire lens system in the collapsed state is minimized. Consequently, the third lens group 3 is not shown in FIG. 1.

The first lens group 1, the second lens group 2 and the third lens group 3 are supported on a first lens frame 1a, a second lens frame 2a and a third lens frame 3a, respectively (see FIG. 2).

The lens system includes a shutter unit 11 which is provided on the second lens frame 2a, as schematically shown in FIGS. 1 and 2.

The lens barrel also includes a fixed member 5, a rotational member 6 fitted in the fixed member 5 and a linearly moving guide member 7 fitted in the rotational member 6 (see FIGS. 1 and 2). In FIG. 1 and 2, reference number 100 shows a CCD (charge-coupled device) fixed to the fixed frame 5.

A subject image is imaged on the CCD 100 through the lens groups 1, 2 and 3.

The first lens frame 1a is provided with a cam follower 1b and the second lens frame 2a is provided with a cam flower 2b (see FIG. 2). The cam followers 1b and 2b are fitted in cam grooves (not shown) provided in the rotational member 6 and pass through a linearly guiding groove 7c provided in the linearly moving guide member 7 and extending along the optical axis. Consequently, the cam follower 1b is positioned at a crossing position of the linearly guiding groove 7c and one of the cam grooves of the rotational member 6, and the cam follower 2b is positioned at a crossing position of the linearly guiding groove 7c and the other of the cam grooves of the rotational member 6. The rotational member 6 constitutes a part of the lens driving apparatus to move the first and second lens frames 1 and 2 in the optical axial direction and disposed within the fixed member 5 to be capable of rotating about the optical axis.

The linearly moving guide member 7 has at a leading end portion thereof a rotational key 7a projecting radially and outwardly from an outer peripheral surface of the linearly moving guide member. The rotational key 7a is fitted in a key groove provided peripherally and inwardly in an inner peripheral surface of the rotational member 6. Accordingly, the rotational member 6 and the linearly moving guide member 7 can be relatively rotated about the optical axis and moved together in the optical axial direction.

The rotational member 6 has at a back end thereof a peripherally extending cam follower 6a which is engaged with a cam provided on the fixed member 5. The rotational member 6 is, when it is rotated about the optical axis, capable of linearly moving in the optical axial direction together with the cam follower 6a along the cam of the fixed member 5. The linearly moving guide member 7 has at a back end thereof a first linearly moving key 7b provided integrally therewith to extend radially and outwardly, which is fitted in a linearly moving guide groove 5d formed in an inner peripheral side of the fixed member 5 to extend to the optical axial direction. Accordingly, the linearly moving guide member 7 is configured to be moved integrally with the rotational member 6 in the optical axial direction without being rotated about the optical axis.

The rotational member 6, the cam groove thereof, the cam follower 6a, the linearly moving guide member 7, the linearly guiding groove 7c thereof, the rotational key 7a and so on constitute the lens driving apparatus or zoom lens driving apparatus to move the lens frames in the optical axial direction.

With this structure, when the rotational member 6 is rotated about the optical axis relative to the fixed member 5, the rotational member 6 is moved in the optical axial direction by engagement of the cam of the fixed member 5 and the cam follower 6a of the rotational member 6. As the rotational member 6 moves in the optical axial direction, the linearly moving guide member 7 is moved with the rotational member 6 in the optical axial direction. The linearly moving guide member 7 cannot be rotated and is adapted to perform only linear movement in the optical axial direction, because the linearly moving key 7b is fitted in the linearly guiding groove 5d of the fixed member 5.

The rotation of the rotational member 6 and the linear movement of the linearly moving guide member 7 make it possible to move the crossing position of the cam groove of the rotational member 6 fitting the cam follower 1b of the first lens frame 1a and the linearly guiding groove 7c in the optical axial direction to move the first lens group 1 in the optical axial direction.

Similarly, the crossing position of the cam groove of the rotational member 6 fitting the cam follower 2b of the second lens frame 2a and the linearly guiding groove 7c is moved in the optical axial direction to move the second lens group 2 in the optical axial direction.

The first lens group 1 and the second lens group 2 can be moved while a mutual relative positional relation of them in the optical axial direction is limited by limitation of the respective cam groove of the rotational member 6. In this case, the first lens group 1 and the second lens group 2 can be moved at any position in a movable range.

FIG. 1 illustrates a state where the first lens group 1 and the second lens group 2 is collapsed to a limited position and the third lens group 3 is in a retracted position in which the third lens group 3 is retracted out of the optical axis. FIG. 2 illustrates a state where the lens groups are extended to a position capable of photographing.

In FIG. 2, the upper half shows a state where the first lens group 1 and the second lens group 2 are in the wide angle end at which the first lens group 1 and the second lens group 2 is extended to a limited position, and the lower half shows a state where the first lens group 1 and the second lens group 2 are in the telescopic end at which the first lens group 1 and the second lens group 2 are moved to a position approaching each other. In this way, each lens group can be moved from the collapsed position to the photographable or extended position. In the photographable position, it is position to change magnification depending on a relative positional relation between the first lens group 1 and the second lens group 2.

At least one biasing member is provided between the first lens frame 1a and the second lens frame 2a. For example, the biasing member comprises a plurality of tension coil springs 10. A biasing force of the coil spring 10 causes the first lens frame 1a and the second lens frame 2a to bias to approach each other and the their cam followers 1b and 2b to maintain to an abutting state with each cam surface of the linearly moving guide member 7 constantly, so that the first lens group 1 and the second lens group 2 can be maintained safely and securely to a state of "non-fall over".

At least one linearly moving-guide biasing member 8 is fitted in an inner peripheral side of the fixed member 5. The linearly moving-guide biasing member 8 includes a resilient structure. The linearly moving guide biasing member 8 has, for example, a ring-like shape. The resilient structure has at least one tension coil spring 9 which is provided between the linearly moving guide member 7 and the linearly moving-guide biasing member 8. In this embodiment, a plurality of linearly moving guide biasing members 8 and a plurality of tension coil springs 9 are provided. More specifically, the linearly moving guide member 7 has at the back end thereof inwardly extending protrusions 7d (see FIG. 2), each of which is configured to attach one end of each of the tension coil springs 9. The protrusions 7d are arranged with intervals on the linearly moving guide member 7 peripherally. Another end of each of the tension coil springs 9 is connected to the linearly moving-guide biasing member 8.

The linearly moving guide biasing member 8 has on a peripheral surface thereof a plurality of second linearly moving guide keys 8a which are radially and outwardly projected. In the illustrated embodiment, three second linearly moving guide keys are provided to be disposed with uniform intervals. The second linearly moving guide keys 8a are fitted in second linearly moving guide grooves 5e provided in the fixed member 5, respectively. By the second linearly moving guide keys 8a being guided along the second linearly moving guide grooves 5e, the linearly moving-guide biasing member 8 can be linearly moved in the optical axial direction.

The linearly moving-guide biasing member 8 is biased to attract or approach each other to the linearly moving guide member 7 by a biasing force of the coil springs 9 and can be moved together with the linearly moving guide member 7. However, a range where the linearly moving-guide biasing member 8 is capable of moving is limited to the range of the second linearly moving guide grooves 5e.

More specifically, forward movement of the linearly moving-guide biasing member 8 is limited just before the rotational member 6 and the linearly moving guide member 7 reach to the photographable state as shown in FIG. 2, when the rotational member 6 and the linearly moving guide member 7 are forwardly moved by rotation of the rotational member 6 from the collapsed position of the lens groups, as shown in FIG. 1.

That is to say, the second linearly moving guide keys 8a engages with a forward end 5c or stop portion of the second linearly moving guide grooves 5e of the fixed member 5, just before the rotational member 6 reaches to a limited position of moving forwardly, and hence the forward movement of the linearly moving-guide biasing member 8 is limited, thereby the linearly moving-guide biasing member 8 is separated from the linearly moving guide member 7. The separation of the linearly moving-guide biasing member 8 from the linearly moving guide member 7 makes it possible to operate a biasing force to bias the linearly moving guide member 7 in the optical axial direction backwardly. The forward end 5c of the second linearly moving guide grooves 5e constitutes a stop part to limit movement of the linearly moving-guide biasing member 8 in the optical axial direction.

When the linearly moving guide member 7 further forwardly are moved with the rotational member 6, the linearly moving-guide biasing member 8 is pulled by the coil springs 9, thereby the linearly moving guide member 7 is biased to be pulled in the optical axial direction backwardly. With this biasing force, the rotational member 6 is biased to be pulled in the optical axial direction backwardly through the rotational key 7a disposed on the forward end of the linearly moving guide member 7. Also, the biasing force makes it possible to press one side surface of the key groove of the rotational member 6 fitting the rotational key 7a of the linearly moving guide member 7 against the rotational key 7a, thereby engagement of the key groove and the rotational key 7a can be securely maintained.

Thus, any backlash in driving the lens groups by rotation of the rotational member 6 can be eliminated, and therefore fall over of the lens groups does not occur, the lens driving apparatus can be securely and efficiently operated. Meanwhile, for example, if three linearly moving-guide biasing members 8 are uniformly and peripherally disposed, it is possible to bias the linearly moving guide member 7 and the rotational member 6 uniformly, regardless of a direction of gravity.

According to the above-mentioned embodiment, because the first lens group 1 and the second lens group 2 are biased to be attracted each other by the biasing member 10, and the rotational member 6 and the linearly moving guide member 7 are adequately and constantly engaged, thereby backlash between the rotational member 6 and the linearly moving guide member 7 is eliminated, therefore the lens groups can be correctly aligned with the optical axis without the fall over of the lens groups, whereby enabling obtaining a lens driving apparatus or zoom lens driving apparatus having less deterioration of image property.

The lens barrel including the lens driving apparatus or zoom lens driving apparatus as described above can be used as a photographic lens barrel for each of various cameras, thereby it is possible to acquire an image having high quality and less deterioration of image property.

Second Embodiment

Next, a second embodiment of the lens barrel according to the present invention is described with reference to FIGS. 4 to 7.

The lens barrel in the second embodiment has a collapsable type having a zoom function.

In FIGS. 4 to 7, a fixed member 41 has a basic end which is fixed to a base plate 67 fixed to a body or the like of a camera (not shown). The base plate 67 has at a central portion a hole in which an image pickup device 66 such as a CCD (charge coupled device) is disposed. The fixed member 41 has a cylindrical shape. The fixed member 41 has at an inner peripheral surface at least one linearly moving guide groove 411 and a female feed screw 412 provided throughout the generally entire length thereof. It is preferable that a plurality of linearly moving guide grooves be provided. A rotational member 42 having a cylindrical shape is fitted in an inner peripheral surface of the fixed member 41, and a linearly moving guide member 43 is fitted in an inner peripheral surface of the rotational member 42.

The rotational member 42 has on an outer periphery of a back end thereof a male screw 421 which can be threaded in the female feed screw 412 of the fixed member 41. Consequently, when the rotational member 42 is rotated about a central axis or optical axis, the screw 421 is configured to be moved in a direction of the optical axis through the guide of the feed screw 412.

Figure 5:
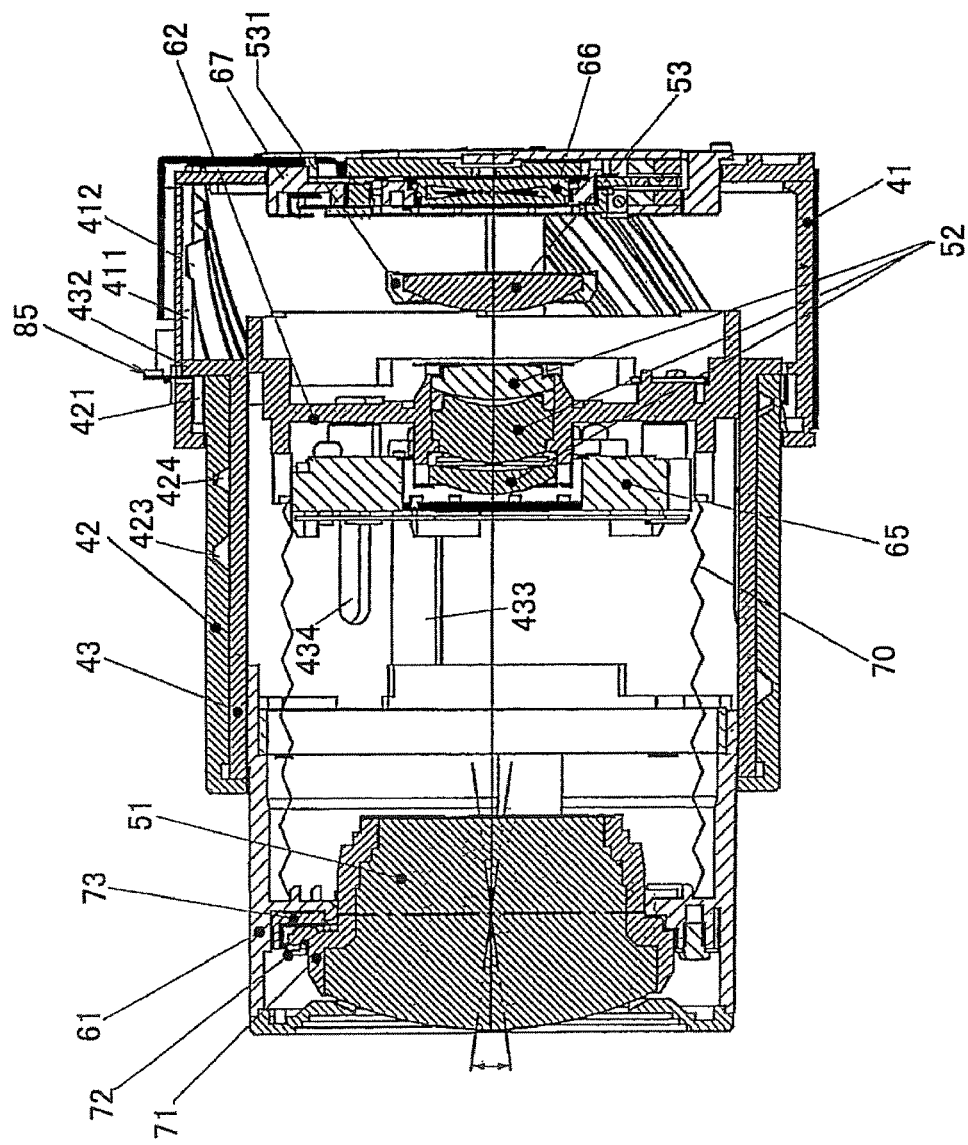
FIG. 5 is a sectional view showing the lens barrel according to the second embodiment, in which the lens barrel is in a photographic position.
Figure 6:
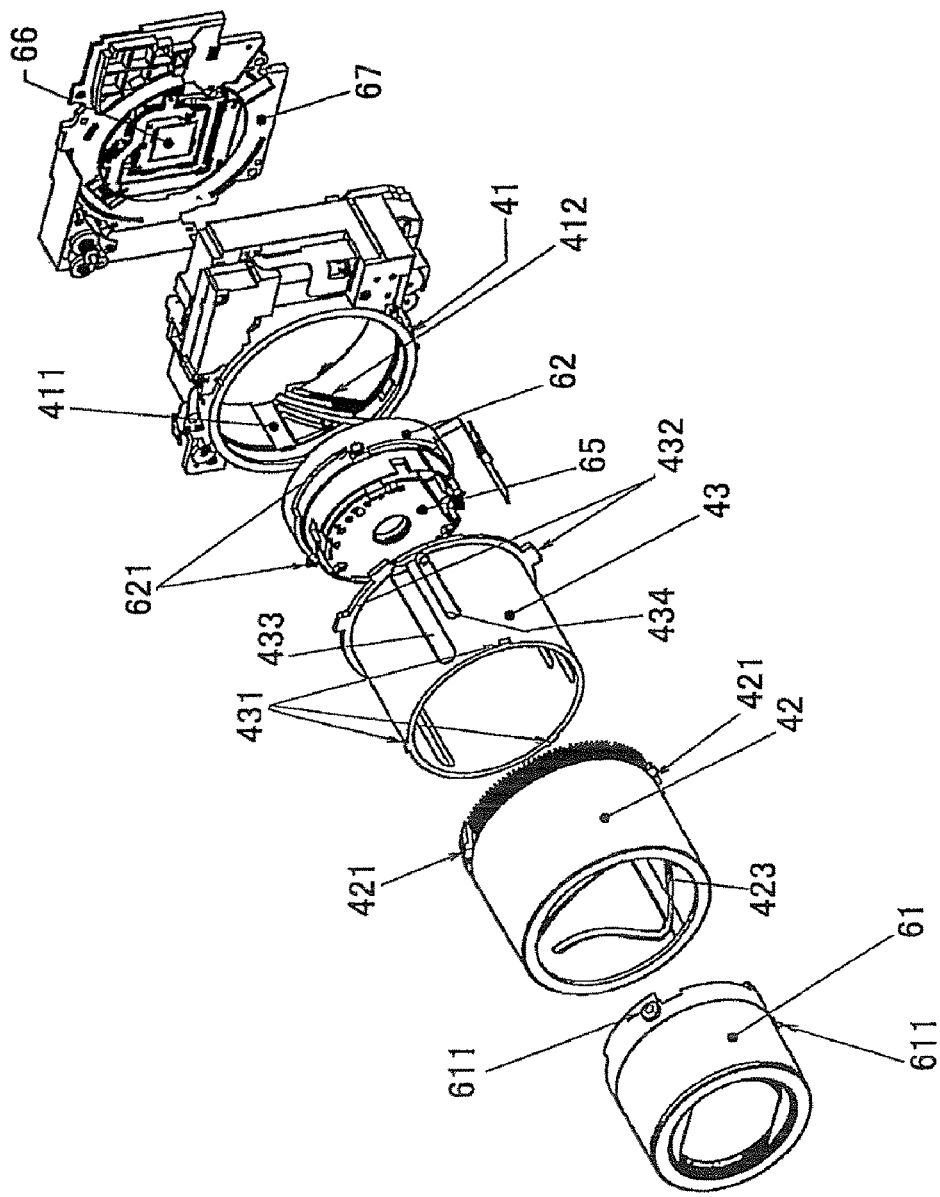
FIG. 6 is an exploded perspective view showing the lens barrel according to the second embodiment.

The linearly moving guide member 43 has on an outer periphery of a forward end (left end in FIGS. 4 and 5) thereof at least one radially and outwardly projecting rotational key 431 (see FIG. 6). The rotational key 431 is fitted in a rotational key groove 425 (see FIG. 7) provided in an inner periphery of a forward end portion of the rotational member 42, thereby the linearly moving guide member 43 can be moved together with the rotational member 42 in the optical axial direction and relatively rotated to the rotational member 42.

At least one radially and outwardly projecting linearly moving key 432 is provided on an outer periphery of a back end of the linearly moving guide member 43. The linearly moving key 432 is fitted in the linearly moving guide groove 411 of the fixed member 41. Accordingly, the linearly moving key 432 can be linearly moved along the linearly moving guide groove 411, but cannot be rotated about the optical axis. The linearly moving guide member 43 has linearly moving grooves 433 and 434 which are respectively three, each of which is formed to pass through it radially and extends in the optical axial direction. The linearly moving grooves are disposed with uniform intervals peripherally.

Two cam grooves 423 and 424 are formed in forward and backward ends of the inner peripheral surface of the rotational member in the optical axial direction. The cam groove 423 can be transversely overlapped to the linearly moving groove 433 in a radial direction, and the cam groove 424 can be transversely overlapped to the linearly moving groove 434 in a radial direction.

Figure 4:
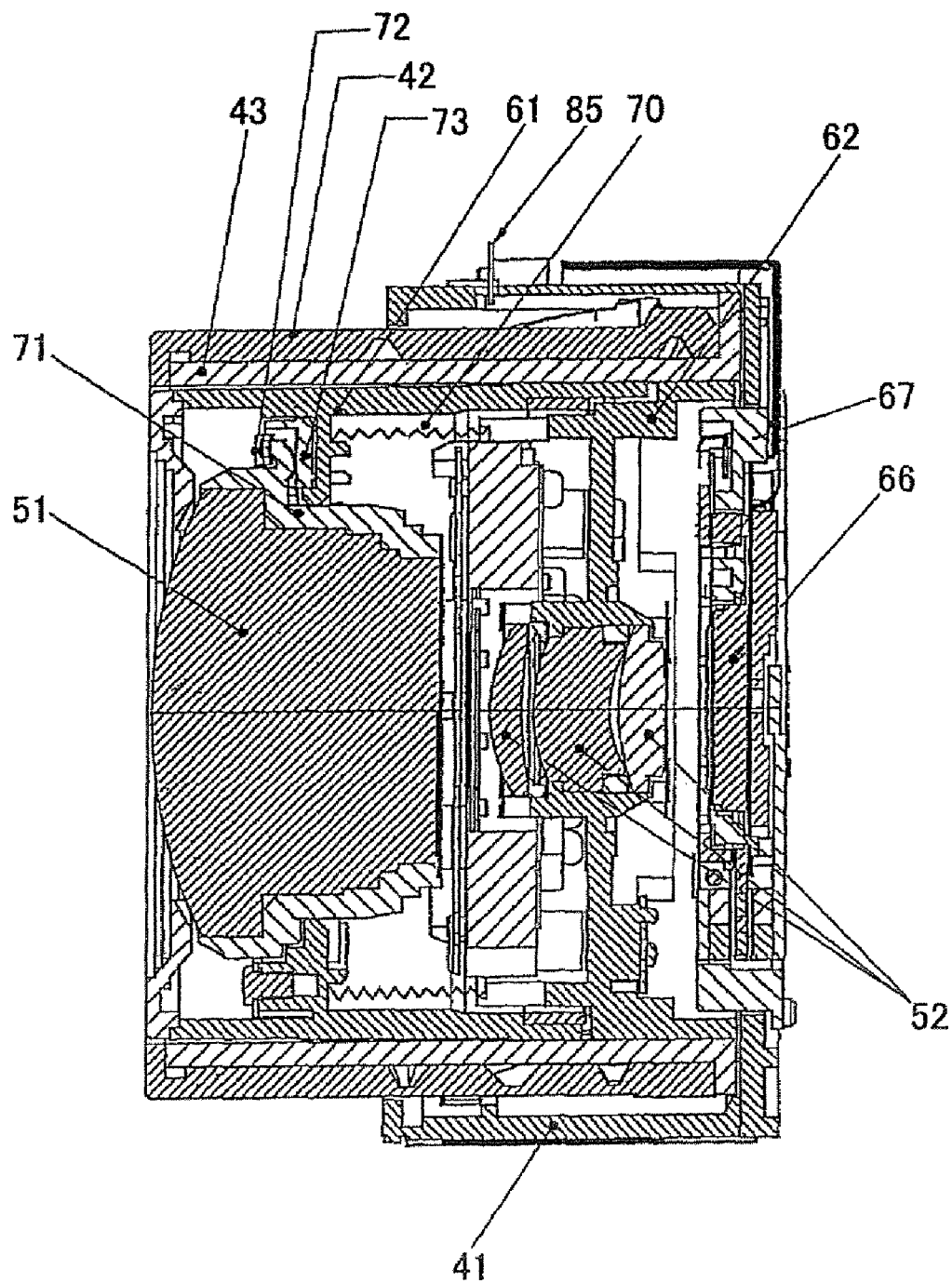
FIG. 4 is a sectional view taken along line A-A of FIG. 3 showing the second embodiment.

As shown in FIGS. 4 and 5, a holding frame 61 of a lens frame 71 which holds a first lens group 51 and a lens frame 62 holding a second lens group 52, which are disposed in order from a subject to be photographed, are fitted in an inner peripheral surface of the linearly moving guide member 43. The above-mentioned holding frame 61 and the lens frame 62 have at their outer peripheral surfaces cam followers 611 and 621, respectively. The cam follower 611 of the holding frame 61 is fitted in a crossing portion of the cam groove 423 and the linearly moving groove 433, and the cam follower 621 of the lens frame 62 is fitted in a crossing portion of the cam groove 424 and the linearly moving groove 434.

Because the crossing portion of the cam groove 423 and the linearly moving groove 433 and the crossing portion of the cam groove 424 and the linearly moving groove 434 are moved in the optical axis direction by rotation of the rotational member 42, the first lens group 51 held by the holding frame 61 and the lens frame 71 and the second lens group 52 held by the lens frame 62 are moved together with the cam followers 611 and 621 fitted in the crossing portions in the optical axial direction.

A shutter/aperture stop unit 65 is disposed between the first lens group 51 and the second lens group 52.

The shutter/aperture stop unit 65 is mounted on the lens frame 62 to hold the second lens group 52 and configured to move with the lens frame 62.

In the collapsed position as shown in FIG. 4, when the rotational member 42 is rotated so as to extend each lens group to a photographable position, the screw 421 is guided by the feed screw 412 of the fixed member to move the rotational member 42 forwardly in the optical axial direction. The linearly moving guide member 43 together with the rotational member 42 also is forwardly moved, while the linearly moving guide member 43 is linearly moved without being rotated, because the linearly moving key 432 is fitted in the linearly moving groove 411 of the fixed member 41.

The rotation of rotational member 42 and the linear movement of the linearly moving guide member 43 cause the first lens group 51 and the second lens group 52, in addition the shutter/aperture stop unit 65 together with the second lens group 52 to move in the optical axial direction. A moved amount of the first lens group 51 and a moved amount of the second lens group 52 to a rotated amount of the rotational member 42 in the optical axial direction depend on a shape of the cam grooves 423 and 424.

FIG. 5 illustrates a state where the first lens group 51 and the second lens group 53 are forwardly moved to the photographable position along the optical axial. In the photographable position, the third lens group 53 is on the optical axis. The third lens group 53 is supported by a lever-shaped lens frame 531. The lens frame 531 can be rotated in such a manner that the third lens group 53 is disposed on the optical axis in the photographic or extended position and retracted out of the optical axis in the collapsed position.

In an operation state as shown in FIG. 5, the rotational member 42 is forwardly moved to a limited position and each lens group is extended to a predetermined position to be positioned in short focal wide angle end and the photographable state. In the short focal wide angle end, when the rotational member 42 is further rotated, the first lens group 51 and the second lens group 52 are moved to the long focal telescopic end. Although the rotational member 42 is in a limitation of movement as shown in FIG. 5, in order to allow the rotational member to further rotate, a forward end of the feed screw 412 of the fixed member 41, with which the screw 421 of the rotational member 42 is engaged, is connected to a peripherally extending groove 412A extending in a perpendicular plane to the optical axis.

Figure 3:
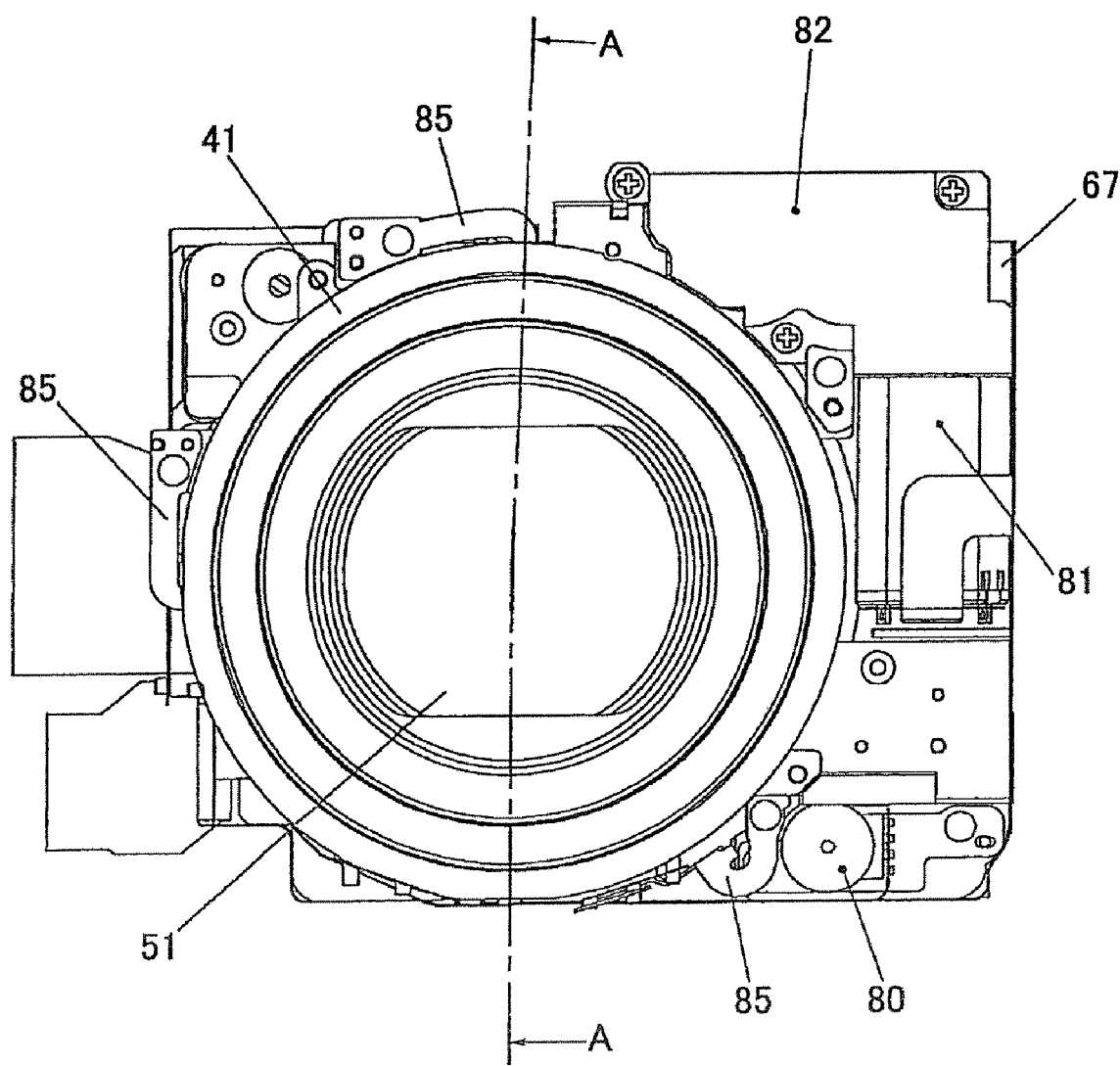
FIG. 3 is a front view showing a lens barrel according to a second embodiment of the present invention, in which the lens barrel is in a collapsed position.

As shown in FIGS. 3, 4 and 5, at least one linearly moving-guide biasing member 85 is provided on an outer peripheral surface of the fixed member 41.

The biasing member includes a resilient structure. In the illustrated embodiment, the resilient structure comprises resilience of the linearly moving-guide biasing member itself.

In the illustrated embodiment, three linearly moving guide biasing members 85 are provided. The biasing members 85 are arranged with intervals on the outer peripheral portion of the fixed member 41 peripherally. Each of the biasing members comprises, for example, a plate-shaped spring. Three convex portions to fix the biasing members 85 are provided on the outer peripheral surface of the fixed member 41. A basic end portion of each of the biasing members 85 is fixed to the corresponding convex portion so that the biasing member is attached to the convex portion in a cantilever-type.

Figure 7:
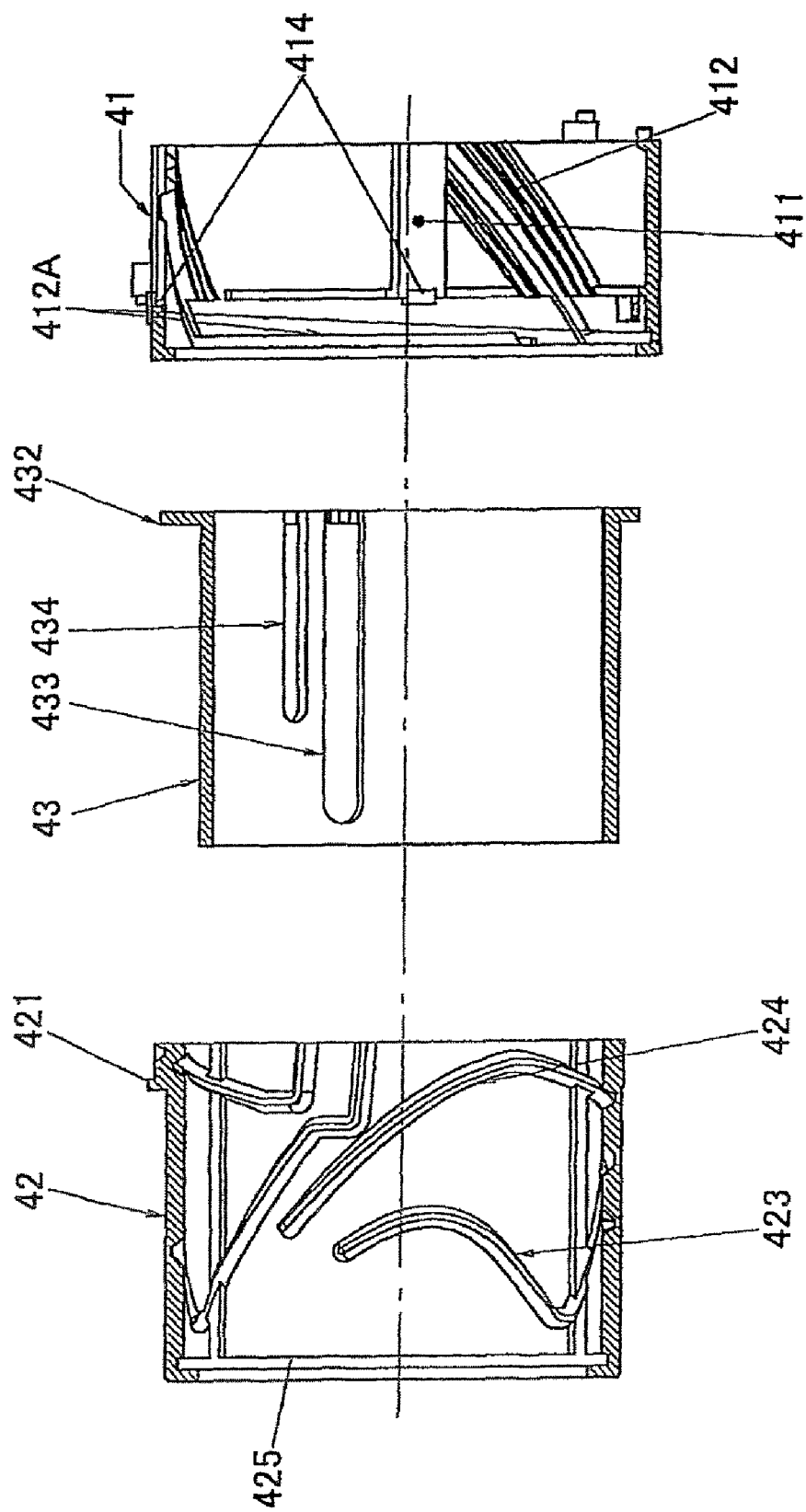
FIG. 7 is an exploded sectional view showing a fixed frame, a rotational frame and a linearly moving guide member in the second embodiment.

Each plate-shaped spring 85 is disposed generally along a plane perpendicular to the optical axis and has a leading end which is bent in an L character shape toward a central direction of the optical axis while maintaining the plane perpendicular to the optical axis. The leading end of each plate-shaped spring 85 passes through a through-window 414 formed in a peripheral wall of the fixed member 41. The windows 414 are respectively formed in the forward end portions of three linearly moving grooves 411 formed in the inner peripheral surface of the fixed member 41, as shown in FIG. 7.

The leading end of each plate-shaped spring 85 is inserted in the linearly moving guide groove 411. The leading end of each plate-shaped spring 85 is in contact with a back edge of each of the windows 414 in a free state where an external force is not applied so that an adequate gap is generated between the leading end and a front edge of the window 414.

As mentioned above, the linearly moving key 432 of the linearly moving guide member 43 is fitted in the linearly moving guide groove 411, and the linearly moving key 432 is guided by the linearly moving guide groove 411, thereby, the linearly moving guide member 43 can be linearly moved Consequently, the linearly moving key 432 abuts with the plate-shaped springs 85 just before arriving at the front end of the linearly moving guide groove 411, in other words, just before arriving from the collapsed position to the photographable state, and hence each plate-shaped spring bends to have an elastic force.

The elastic force continues to operate as long as the linearly moving guide member is in an extended state to the photographable position, and operates the linearly moving guide member 43 and the rotational member 41 to bias backwardly. When each lens group is moved from the photographable position to the collapsed position, the linearly moving key 432 is separated from the plate-shaped springs 85. In other words, the biasing force of the plate-shaped springs 85 in a state where the linearly moving guide member 43 is collapsed backwardly from the photographable position does not operate to the linearly moving guide member 43.

According to the second embodiment as described above, by biasing the linearly moving guide member 43 in the state extending each lens group, in the optical axial direction, the linearly moving guide member 43 is prevented from being fallen and hence the fall over of the lens frames held on the inner peripheral surface of the linearly moving guide member 43 can be prevented.

The rotational key 431 of the linearly moving guide member 43 is engaged in a rotational key groove 425 provided in the rotational member 42, thereby, the relative movement of the linearly moving guide member 43 to the rotational member 42 in the optical axial direction is limited, while can be relatively rotated to the rotational member 42. Therefore, fall over and backlash of the rotational member can be prevented simultaneously with the linearly moving guide member 43.

Because an abutting part of the linearly moving guide member 43, with which the linearly moving guide biasing members or plate-shaped springs 85 is abutted cannot be rotated relative to the rotational member 41 corresponds to the linearly moving key 432 which can be relatively moved in the optical axial direction, it is possible to reduce the number of parts and give a biasing force to the linearly moving guide member 43 by use of an existing space.

It is possible to accomplish a compact linearly moving guide biasing member by forming the biasing member by the plate-shaped spring and give a biasing force by an inexpensive part efficiently.

It is preferable that three or more plate-shaped springs 85 be disposed on the fixed member 41 peripherally and three or more rotational keys 431 be provided on the linearly moving guide member 43. Thereby, biasing forces are applied to the linearly moving guide member 43 and the rotational member 42 at three or more places to prevent fall over of each of the linearly moving guide member 43 and the rotational member 42.

The plate-shaped springs 85 and the rotational keys 431 are disposed with non-uniform intervals peripherally in the illustrated embodiment, but may be disposed with uniform intervals peripherally. With such a structure, the biasing force is uniformly applied to each of the linearly moving guide member 43 and the rotational member 42, and hence the fall over of each of the linearly moving guide member 43 and the rotational member 42 can be efficiently prevented.

The plate-shaped springs 85 and the linearly moving guide member 43 are in contact with each other constantly in a case where each lens group is in the photographic state, whereas they are separated in a case where each lens group is not in the photographic state. Therefore, an energy overcoming the biasing force is needed only when each lens group is in the photographic state in the biasing force is needed. Consequently, because extra energy is not needed when each lens group is not in the photographic state, it is possible to prevent the fall over of each of the linearly moving guide member 43 and the rotational member 42, efficiently and accomplish a reduced energy design.

As described above, according to the present invention, it is possible to provide a lens or zoom lens driving apparatus in which the rotation of the rotational member 42, the plurality of lens groups can be moved in appropriate positions within a movable range by the cam provided on the rotational member to change a focal distance of the lens groups, and the lens groups can be collapsed with narrow intervals at the time of the non-photograph. It is also possible to provide a compact lens barrel in which the lens groups can be prevented from falling, and therefore high relative positional accuracy of the lens groups can be acquired.

The above-mentioned lens barrel including the zoom lens driving apparatus can be applied to any camera. Such a camera has a structure in which the lens groups have no fall over and have high imaging property.

In the above-mentioned second embodiment, the rotational member 42 is rotated by an electric power. More specifically, FIG. 3 illustrates a drive motor 81 which is a drive source of the rotational member 42 and a power transmission 82 such as a gear array or the like transmitting a rotational force of the drive motor 81 to the rotational member 42.

The drive motor 81 operates the rotational member 42, dividing in a range between the collapsed position and the short focal wide angle end and a range between the short focal wide angle end and the long focal telescopic end.

In the range between the short focal wide angle end and the long focal telescopic end, the drive motor 81 is operated by a zoom operational button.

In addition, the lens barrel includes an auto-focus apparatus. The auto-focus apparatus includes a focus driving motor 80, rotation of which is controlled by a control signal from a focal detector. For example, the first lens group 51 is driven by the driving motor 80 in the optical axial direction to obtain an adequate focal point.

In the illustrated embodiment, the present invention has applied to a lens barrel including a zoom mechanism, but the present invention is not limited to this embodiment. For example, the present invention can be applied to a lens barrel having no zoom mechanism.

The lens barrel according to the present invention cam be applied to a digital camera or photographic lens for various cameras, thereby a camera having high imaging property can be obtained.

Although the preferred embodiments of the present invention have been mentioned, the present invention is not limited to these embodiments, various modifications and changes can be made to the embodiments.

The invention claimed is:

1. A lens barrel, comprising:
   a plurality of lens groups,
   a plurality of lens frames each of which holds each of the plurality of lens groups,
   a lens driving apparatus configured to move the lens frames in an optical axial direction, and
   a fixed member to hold the lens driving apparatus,
   the lens driving apparatus being capable of moving the lens frames from a collapsed position to a photographic position,
   the lens driving apparatus including
   a rotational member supported rotatably on the fixed member and capable of moving in the optical axial direction while rotating relative to the fixed member, the rotational member being configured to support a plurality of frames of the plurality of lens frames and move the supported frames in the optical axial direction when the rotational member is rotated relative to the fixed member,
   a linearly moving guide member configured to be supported on the rotational member to be rotated relative to the rotational member, while being moved with the rotational member in the optical axial direction while limiting rotation of the lens frames
   at least one linearly moving-guide biasing member which is supported on the fixed member to be capable of moving in the optical axial direction relative to the linearly moving guide member and is configured to limit rotation, and
   a resilient structure provided to connect the linearly moving guide member and the linearly moving-guide biasing member,
   when the plurality of lens groups are moved in the optical axial direction from the collapsed position to the photographic position, the linearly moving-guide biasing member being configured to be moved with the linearly moving guide member, but stopped at a position before the photographic position, and the linearly moving guide member being configured to be biased by the resilient structure toward the collapsed position in the optical axial direction while the linearly moving guide member is further moved to the photographic position.

2. The lens barrel according to claim 1, wherein
   the resilient structure includes a resilient member provided between the linearly moving guide member and the linearly moving-guide biasing member.

3. The lens barrel according to claim 1, wherein
   the resilient structure comprises resilience of the linearly moving-guide biasing member itself.

4. The lens barrel according to claim 1, wherein
   the linearly moving guide member includes a first linearly moving guide key which is fitted in a first linearly moving guide groove provided in the fixed member to be capable of moving in the optical axial direction,
   wherein the linearly moving-guide biasing member includes a second linearly moving guide key which is fitted in a second linearly moving guide groove provided in the fixed member to be capable of moving in the optical axial direction, and
   wherein the fixed member includes a stop portion which engages with the second moving guide key so that movement of the linearly moving-guide biasing member is limited just before the rotational member extends forwardly while rotating and reaches a photographable position.

5. The lens barrel according to claim 1, wherein
   the fixed member includes at an inner periphery a cam engaging with a cam follower provided on the rotational member, a first linearly moving guide groove in which a first linearly moving guide key provided on the linearly moving guide member is fitted, and a second linearly moving guide groove in which a second linearly moving guide key provided on the linearly moving guide member is fitted,
   wherein the linearly moving guide member is fitted in the rotational member and includes a radially projecting rotational key which is fitted in a rotational key groove provided in the rotational member to be capable of moving together the rotational member in the optical axial direction and rotating about an optical axis,
   wherein the resilient structure of the linearly moving-guide biasing member is configured to bias the linearly moving guide member and the rotational member toward the fixed member through the rotational key of the linearly moving guide member.

6. The lens barrel according to claim 2, wherein
   the resilient member comprises a plurality of tensile coil springs,
   wherein the plurality of tensile coil springs are disposed with uniform intervals on an peripheral surface of the linearly moving guide member.

7. A zoom lens driving apparatus used in a lens barrel that includes a plurality of lens groups, a plurality of lens frames each of which holds each of the plurality of lens groups, a lens driving apparatus configured to move the lens frames in an optical axial direction, and a fixed member to hold the lens driving apparatus, the lens driving apparatus being capable of moving the lens frames from a collapsed position to a photographic position, the lens driving apparatus including a rotational member supported rotatably on the fixed member and capable of moving in the optical axial direction while rotating relative to the fixed member, the rotational member being configured to support a plurality of frames of the plurality of lens frames move the supported frames in the optical axial direction when the rotational member is rotated relative to the fixed member, a linearly moving guide member configured to be supported on the rotational member to be rotated relative to the rotational member, while being moved with the rotational member in the optical axial direction while limiting rotation of the lens frames at least one linearly moving-guide biasing member which is supported on the fixed member to be capable of moving in the optical axial direction relative to the linearly moving guide member and is configured to limit rotation, and a resilient structure provided to connect the linearly moving guide member and the linearly moving-guide biasing member, when the plurality of lens groups are moved in the optical axial direction from the collapsed position to the photographic position, the linearly moving-guide biasing member being configured to be moved with the linearly moving guide member, but stopped at a position before the photographic position, and the linearly moving guide member being configured to be biased by the resilient structure toward the collapsed position in the optical axial direction while the linearly moving guide member is further moved to the photographic position, the zoom lens driving apparatus comprising:

a cam provided on the rotational member, wherein the plurality of lens groups are moved in an appropriate position in a movable range through the cam depending on rotation of the rotational member to vary a focal distance, and wherein the plurality of lens groups are collapsed with less intervals among the lens groups when a photograph is not made.

8. A lens driving apparatus, comprising:

a plurality of lens groups, a plurality of lens frames each of which holds each of the plurality of lens groups, a lens driving apparatus configured to move the lens frames in an optical axial direction, and a fixed member to hold the lens driving apparatus, the lens driving apparatus being capable of moving the lenses from a collapsed position to a photographic position, the lens driving apparatus including a rotational member capable of moving in the optical axial direction while rotating relative to the fixed member, a linearly moving guide member which moves with the rotational member in the optical axial direction while limiting rotation of the lens frames and is not capable of rotating, and at least one linearly moving-guide biasing member which is capable of moving in the optical axial direction relative to the linearly moving guide member and is configured to limit rotation, wherein the linearly moving-guide biasing member is in contact with the linearly moving guide member in a state where the linearly moving guide member is extended to the photographic position and biases the linearly moving guide member toward the collapsed position along the optical axial direction, wherein the linearly moving-guide biasing member is separated from the linearly moving guide member in a state where the linearly moving guide member is moved from the photographic position toward the collapsed position.

9. The lens driving apparatus according to claim 8, wherein
the linearly moving guide member includes a rotational key which is fitted in a rotational key groove provided in the rotational member to limit relative movement in the optical axial direction and be capable of performing relative rotation.

10. The lens driving apparatus according to claim 8, wherein
an abutting portion of the linearly moving guide member with the linearly moving-guide biasing member is a portion of a rotational key allowing rotation of the linearly moving guide member to limit and move it relative to the fixed member in the optical axial direction.

11. The lens driving apparatus according to claim 8, wherein the linearly moving-guide biasing member is a plate-shaped spring.

12. The lens driving apparatus according to claim 8, wherein
three or more linearly moving-guide biasing members are arranged with uniform intervals peripherally, and
wherein three or more rotational keys are arranged with uniform intervals on the linearly moving guide member peripherally.

13. The lens driving apparatus according to claim 8, wherein
the linearly moving-guide biasing member and the linearly moving guide member are in contact constantly when the lens groups are in the photographic position, and are separated from each other when the lens groups are not in the photographic position.

14. A zoom lens driving apparatus used in the lens barrel as recited in claim 8,
the zoom lens driving apparatus comprising:
a cam provided on the rotational member,
wherein the plurality of lens groups are moved in an appropriate position in a movable range through the cam depending on rotation of the rotational member to vary a focal distance, and
wherein the plurality of lens groups are collapsed with less intervals among the lens groups when photograph is not made.

15. A camera comprising the lens barrel as recited in claim 1.

16. A camera comprising a lens barrel including the lens driving apparatus as recited in claim 8.

17. A camera comprising a lens barrel including the zoom lens driving apparatus as recited in claim 7.

18. A camera comprising a lens barrel including the zoom lens driving apparatus as recited in claim 14.

* * * * *